United States Patent
Ho et al.

(10) Patent No.: US 7,248,738 B2
(45) Date of Patent: Jul. 24, 2007

(54) IMAGE CLUSTERING WITH METRIC, LOCAL LINEAR STRUCTURE, AND AFFINE SYMMETRY

(75) Inventors: Jeffrey Ho, Gainesville, FL (US); Jongwoo Lim, La Jolla, CA (US); Ming-Hsuan Yang, Mountain View, CA (US)

(73) Assignee: Honda Motor Co., Tokyo (JP)

( * ) Notice: Subject to any disclaimer, the term of this patent is extended or adjusted under 35 U.S.C. 154(b) by 109 days.

(21) Appl. No.: 10/989,967

(22) Filed: Nov. 15, 2004

(65) Prior Publication Data

US 2005/0141769 A1    Jun. 30, 2005

Related U.S. Application Data

(60) Provisional application No. 60/520,004, filed on Nov. 13, 2003.

(51) Int. Cl.
*G06K 9/62* (2006.01)
(52) U.S. Cl. .................................... 382/225
(58) Field of Classification Search ............... 382/103, 382/181, 191, 224–225, 305
See application file for complete search history.

(56) References Cited

U.S. PATENT DOCUMENTS 5,239,596 A * 8/1993 Mahoney ................. 382/180
6,052,485 A * 4/2000 Nelson et al. ............. 382/225
2002/0097914 A1* 7/2002 Yaung ........................ 382/225

OTHER PUBLICATIONS

Ng, et al. "On spectral clustering: analysis and an algorithm", U.C.Berkeley, pp. 1-9, 2001.*
Basri, et al. "Clustering appearances of 3D objects", IEEE, pp. 1-8, 1998.*
Huo "(A local smoothing and geodesic distance based clustering algorithm for high dimensional noisy data; utilizing embedded geometric structures", GIT, pp. 1-5, Mar. 18, 2003.*
Belhumeur, et al "What is the set of images of an object under all possible illumination conditions?", International journal of computer vision, pp. 1-16.*
PCT International Search Report and Written Opinion, PCT/US04/38347, Sep. 1, 2006, 7 pages.

* cited by examiner

*Primary Examiner*—Daniel Mariam
(74) *Attorney, Agent, or Firm*—Fenwick & West LLP; Mark E. Duell, Esq.

(57) ABSTRACT

A system and a method are disclosed for clustering images of objects seen from different viewpoints. That is, given an unlabelled set of images of n objects, an unsupervised algorithm groups the images into N disjoint subsets such that each subset only contains images of a single object. The clustering method makes use of a broad geometric framework that exploits the interplay between the geometry of appearance manifolds and the symmetry of the 2D affine group.

6 Claims, 7 Drawing Sheets

(a)

(b)

(a)

(b)

(c)

| Dataset | K | Error Rate, % |
|---|---|---|
| FACE10 | 10 | 0.00 |
| COIL20 | 8 | 0.00 |
| COIL20.2 | 8 | 5.14 |
| COIL20.4 | 8 | 19.44 |
| VEHICLE10.2 | 3 | 11.11 |
| CIOL100.2 | 6 | 20.69 |
| COIL100.4 | 10 | 34.89 |

900

| Clustering Algorithms | Percent Error per Dataset | | | |
|---|---|---|---|---|
| | COIL20.2 | COIL20.4 | FACE10 | VEH10.2 |
| Affine-invariant + K- nearest neighbor + Local Linear Structure + Spectral Clustering | 5.14 | 19.44 | 0.00 | 11.11 |
| Affine-invariant + K-nearest neighbor + Spectral Clustering | 7.36 | 21.11 | 13.00 | 27.5 |
| Affine-invariant + Spectral Clustering | 10.14 | 25.83 | 22.00 | 40.00 |
| Euclidian Distance + Spectral Clustering | 35.14 | 33.06 | 25.60 | 61.67 |
| Euclidian Distance + K-means Clustering | 39.58 | 48.06 | 46.00 | 74.44 |

Fig. 9

IMAGE CLUSTERING WITH METRIC, LOCAL LINEAR STRUCTURE, AND AFFINE SYMMETRY

CROSS REFERENCE TO RELATED APPLICATIONS

This application claims priority under 35 USC § 119(e) to U.S. Provisional Patent Application No. 60/520,004, filed Nov. 13, 2003 titled "Image Clustering with Metric, Local Linear Structure and Affine Symmetry," the content of which is incorporated by reference herein in its entirety.

This application is related to U.S. patent application Ser. No. 10/703,294, filed on Nov. 06, 2003, entitled "Clustering Appearances of Objects Under Varying Illumination Conditions," the content of which is incorporated by reference herein in its entirety.

FIELD OF THE INVENTION

The present invention generally relates to the field of computer vision, and more specifically to clustering observed objects according to object type.

BACKGROUND OF THE INVENTION

From the photography aficionado type digital cameras to the high-end computer vision systems, digital imaging is a fast growing technology that is becoming an integral part of everyday life. In its most basic definition, a digital image is a computer readable representation of an image of a subject or object taken by a digital imaging device, e.g. a camera, video camera, or the like. A computer readable representation, or digital image, typically includes a number of pixels arranged in an image file or document according to one of many available graphic formats. For example, some graphic file formats include, without limitation, bitmap, Graphics Interchange Format (GIF), Joint Photographic Experts Group (JPEG) format, and the like. An object is anything that can be imaged, e.g., photographed, video taped, or the like. In general, an object may be an inanimate physical object or part thereof, a person or a part thereof, a scenic view, an animal, or the like. An image of an object typically comprises viewing conditions that, to some extent, make the image unique. In imaging, viewing conditions typically refer to the relative orientation between the camera and the object (e.g., the pose), and the external illumination under which the images are acquired.

Given a collection of images of 3-dimensional objects, where the observer's viewpoint has varied between images, one may wish to cluster the images, e.g., group them according to the identity of the objects. This problem requires understanding how the images of an object vary under different viewing conditions, so that the goal of a clustering method or algorithm is to detect some consistent patterns among the images. One conventional computer vision approach to solving this problem utilizes some kind of image feature extraction, e.g., texture, shape, filter bank outputs, etc. A description of this is in B. L. Saux and N. Boujemaa, "Unsupervised robust clustering for image database categorization," International Conference on Pattern Recognition, Volume 1 (2002); and in H. Frigui et al., "Unsupervised clustering and feature discrimination with application to image database categorization," Joint 9th IFSA World Congress and 20th NAFIPS Conference (2001), which are incorporated herein in their entirety. The underlying assumption of this approach is that some global or local image properties of a 3D object exist over a wide range of viewing conditions. A shortcoming of this approach is that it is usually difficult to extract these features reliably and consistently.

Appearance-based approaches utilize a different strategy for tackling the clustering problem, whereby image feature extraction no longer plays a significant role. Instead, the concept of geometric relations among images in the image space is central, and the primary analytical paradigm is the appearance manifold. Descriptions of these concepts can be found in R. Basri et al., "Clustering appearances of 3D objects," Proceedings of IEEE Conference on Computer Vision and Pattern Recognition. (1998), in A. W. Fitzgibbon and A. Zisserman, "On affine invariant clustering and automatic cast listing in movies," in A. Heyden, G. Sparr, M. Nielsen, P. Johansen, eds., Proceedings of the Seventh European Conference on Computer Vision. LNCS 2353, Springer-Verlag (2002), and in H. Murase and S. K. Nayar, "Visual learning and recognition of 3-D objects from appearance," International Journal of Computer Vision, Volume 14. (1995), which are incorporated by reference herein it their entirety. While existing appearance-based methods represent an improvement over feature extraction, they nonetheless suffer from lack of reliability and from inconsistency.

The bases of the shortcomings of conventional appearance-based approaches may be understood by reference to FIG. 1. FIG. 1($a$) shows a hypothetical/ideal projection of the images of three objects onto the image space, as discussed in Murase and Nayar, cited above, wherein the three axes represent the three most significant eigenvectors of the eigenspace. While limitation to three eigenvectors/axes provides an intuitively tangible example, the analysis may be mathematically extended to a larger number of eigenvectors/dimensions. Each ellipse 110 corresponds to one object. The sample points 120 of each ellipse correspond to images of the respective object taken over pose, e.g., over rotation about one axis, with constant illumination. The essence of the clustering problem is to associate images with the correct ellipse, e.g., to correctly identify a particular observed image and its projection point through association with the appropriate ellipse 110.

In general, the clustering problem is complicated by the inherently sampled nature of data 120 and by the presence of error in the image capture process. Such error may arise, for example, from inaccuracy or noise in the image capture apparatus. Also, the sample points may lie in close proximity to one another. Accordingly, the clustering method must be sufficiently robust to afford reliable results with limited and inaccurate data. For example, a datum 130 that is actually a member of ellipse 110$a$ might be erroneously associated with ellipse 110$b$, since it might be closer to another observed datum on ellipse 110$b$ versus one on ellipse 110$a$. Consequently, the clustering algorithm would need to take advantage of knowledge of the manifold structure by constructing virtual points 140 from which to provide meaningful distance metrics.

Yet another basis for inaccurate clustering is depicted in FIG. 1$b$, wherein hypothetical ellipses 150$a$ and 150$c$ have been tilted with respect to their counterparts in FIG. 1$a$. Specifically, in region 160, the ellipses are sufficiently close to one another as to cause instability in conventional clustering methods. For example, as shown conceptually in region 170, several trajectories may be imagined based upon the sample points shown.

In conventional systems, e.g., Saux and Boujemaa, appearance-based clustering methods often utilize projections, e.g., geometric transformations from the image/manifold space to lower-order spaces, wherein the final clustering operations are performed. With regard to unstable regions such as region 160, it becomes difficult to synthesize the correct trajectories in the projection space as well. This is illustrated in FIG. 2, which shows intermediate clustering results based on three projection methods. The projection spaces shown were derived from sample images of three model cars taken over rotation with constant illumination.

FIG. 2(a) shows the results of a principal components analysis algorithm as discussed in Murase and Nayar, which was cited above. As can be appreciated, there is such high dispersion of the data that no trajectories can be discerned, that is, there is no basis for clustering decisions. This is a consequence of the fact that the local linear estimates utilized for transformation become unstable for complex regions of the manifold structure. FIG. 2(b) shows the results of an isomap algorithm. An example of this can be found in Joshua B. Tenenbaum, Vin de Silva and John C. Langford, "A Global Geometric Framework for Nonlinear Dimensionality Reduction," Science, Vol. 290, No. 5500 (2000), which is incorporated herein in its entirety. While it is clear that a collection of trajectories exists, there is little separation of the individual trajectories. Thus, again there is little basis for effective clustering. FIG. 2(c) shows the results of local linear embedding. An example of this can be found in Sam T. Roweis and Lawrence K. Saul, Nonlinear Dimensionality Reduction by Locally Linear Embedding, Science, Vol. 290, No. 5500 (2000), which is incorporated herein in its entirety. As shown by the superimposed boundaries 210, there is a basis for making clustering decisions. However, the boundaries overlap, indicating potential for instability or incorrect clustering.

Based upon the foregoing, there is a need for an improved system and method for clustering images that will yield reliable results for a wide variety of objects in the presence of noise and inaccuracy.

SUMMARY OF THE INVENTION

The present invention includes a system and a method for improved appearance-based image clustering. The method first derives distance measures between all pairs of input images, and then selects a number of nearest neighbors (e.g., most similar images) for refined analysis. The subsequent methodology is based upon principles of differential geometry. It exploits the local linear structure of the appearance manifold and involves projection from the image space to a lower-order analysis space. The resulting refined distance measurements among the nearest neighbors are then agglomerated into a distance matrix. This matrix is then applied to a spectral clustering algorithm to yield the final clustering result. Spectral clustering has been studied quite intensively in combinatorial graph theory, and is well known in the art. Description of these concepts may be found in Y. Weiss "Segmentation using eigenvectors: A unifying view," Proceedings of IEEE International Conference on Computer Vision, Volume 2. (1999), in F. R. K. Chung, "Spectral Graph Theory," American Mathematical Society (1997), and in J. Ho et al., "Clustering appearances of objects under varying illumination conditions," IEEE Conf. on Computer Vision and Pattern Recognition, Volume 1 (2003), which are incorporated by reference herein in their entirety.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. ("FIG.") 1 illustrates general concepts of appearance manifolds and clustering methods.

FIG. 9 illustrates the results of performance evaluation of various clustering methods.

DETAILED DESCRIPTION OF THE PREFERRED EMBODIMENTS

Reference will now be made in detail to several embodiments of the present invention, examples of which are illustrated in the accompanying figures. Wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 3:
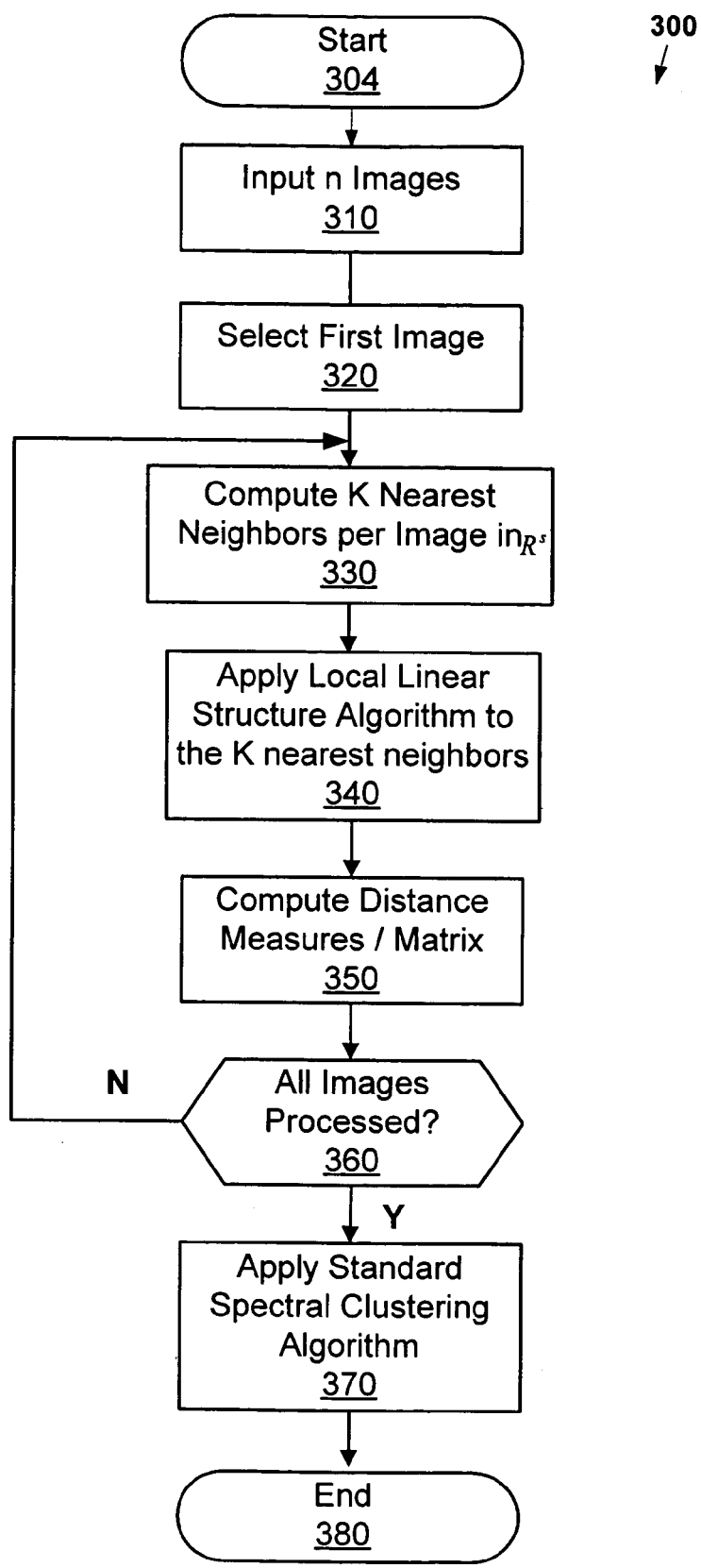
FIG. 3 is a flow chart illustrating the method of the present invention according to one embodiment of the present invention.

The method according to one embodiment of the present invention may be understood with reference to the flowchart of FIG. 3. At step 310, a collection of n unlabelled images $\{I_1, \ldots, I_n\}$ is received. It is assumed that all images have the same number of pixels s, and that by rasterizing the images, a collection of corresponding sample points $\{x_1, \ldots, x_n\}$ is obtained in the image space $IR^s$. The objective of the clustering method is to output a cluster assignment for these images $\rho:\{I_1, \ldots, I_n\} \rightarrow \{1, \ldots, N\}$, such that two images $I_i$ and $I_j$ belong to the same cluster if and only if $\rho(I_i)=\rho(I_j)$. Ideally, each cluster will consist only of images of one object. It is further assumed that the images of a cluster are acquired at different viewpoints but under the same ambient illumination condition.

At step 320, a first image of the set of n images is selected. At step 330, a set of K nearest neighbors within the image space relative to the first image is determined. This may be done in accordance with techniques that are well known in the art, e.g., the $L^2$ metric or its derivatives (e.g., affine-invariant $L^2$ distance or weighted $L^2$ distance). Optionally, the one-sided distance measure discussed below may be used. Within the neighborhood thus defined, information other than distance is next exploited as discussed below. As such, the overall clustering problem becomes a collection of local clustering operations. The choice of parameter K is a design tradeoff, and is considered below in the discussion of experimental results.

For the set of K nearest neighbors, a local linear structure (LLS) algorithm is applied per step 340. This algorithm in turn comprises several aspects pertinent to topological appearance manifolds as discussed in Murase and Nayar, which was cited above. Appearance manifolds arise as a consequence of the representation of two-dimensional physical images as points in the higher dimensional abstract space $IR^s$ and are well known in the art. A first aspect of LLS is that the set of n input images implies the existence of N sub-manifolds in $IR^s$, $\{M_1, \ldots, M_N\}$, such that two input image samples $x_i$, $x_j$ belong to the same cluster if and only if $x_i, x_j \in M_k$ for some $1 \leq k \leq N$, with each $M_i$ denoting the appearance manifold of an object.

A second aspect of LLS is the local linearity of manifolds and sub-manifolds. That is, if $x_1, \ldots, x_l$ are data points belonging to the same cluster and are nearest neighbors, then each point $x_i$ can be well-approximated linearly by its nearest neighbors, so that $$x_k \approx \sum_{j \neq k} a_j x_j$$

for some real numbers $\alpha_j$.

A third aspect of LLS is the action of the two-dimensional (2D) affine group G. This is an aspect of differential geometry, and distinguishes the image clustering problem from a general data clustering problem. For example, if $\{x_1, \ldots, x_n\}$ were data from a meteorological or high-energy physics experiment, there would not be an explicit action of G. Based on the 2D nature of the input images and the rasterization of the image to form points in $IR^s$, the action of G can be explicitly calculated given a sample point x. In particular, each appearance sub-manifold $M_i$ is invariant under G. That is, if $x \in M_i$ then $\gamma(x) \in M_i$ for each $\gamma \in G$. In this sense, the clustering problem acquires a symmetry according to the 2D affine group.

Figure 4:
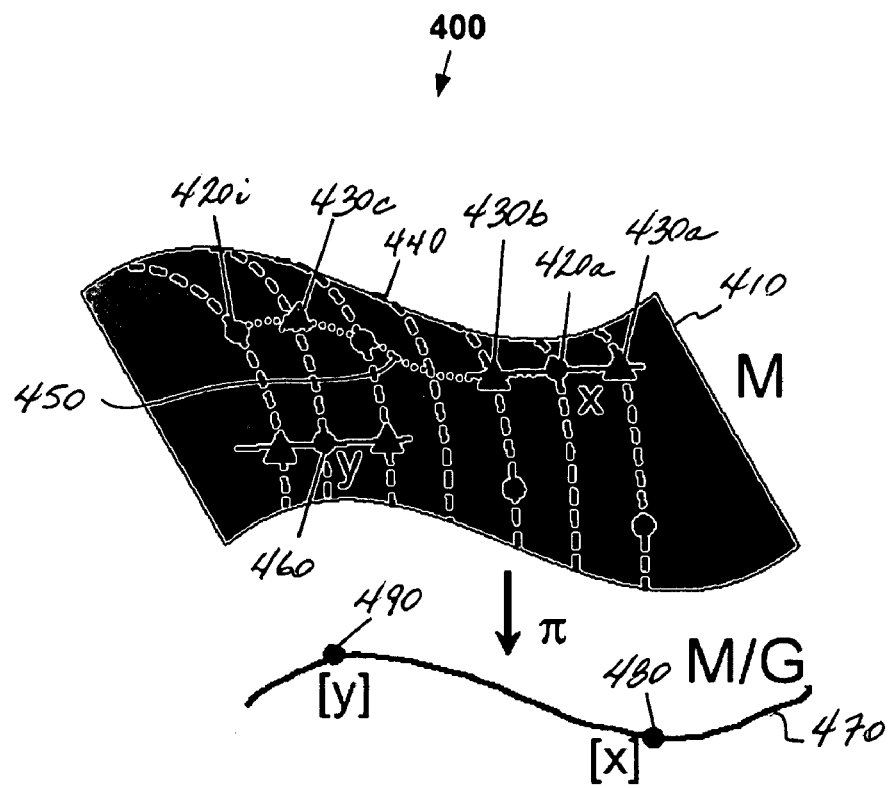
FIG. 4 illustrates a geometric interpretation of the appearance manifold in the image space, and a projection thereof onto the quotient space according to one embodiment of the present invention.

These principles of LLS step 340 may be visualized according to the geometric interpretation of FIG. 4. Manifold 410 corresponds to the input data $x_i$. Its exact structure is not known, but several of its characteristics are known and can be used by the LLS algorithm. In particular, with respect to one or more nearest neighbors $x_j$, manifold 410 is continuous, locally linear, and includes multiple "orbits," e.g., cyclic linear trajectories. The latter property is referred to in the art as "affine symmetry."

By way of contrast, conventional methods of exploiting local linearity include computation of the "tangent space" using Principal Component Analysis (PCA), as discussed in Fitzgibbon and Zisserman, which was cited above.

Figure 1:
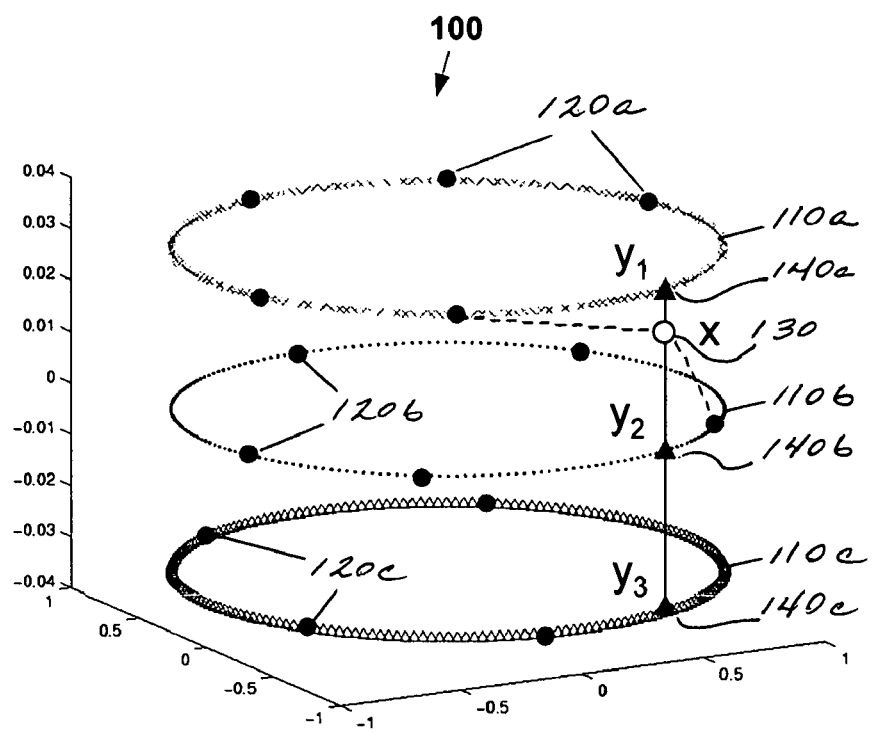
Figure 1:
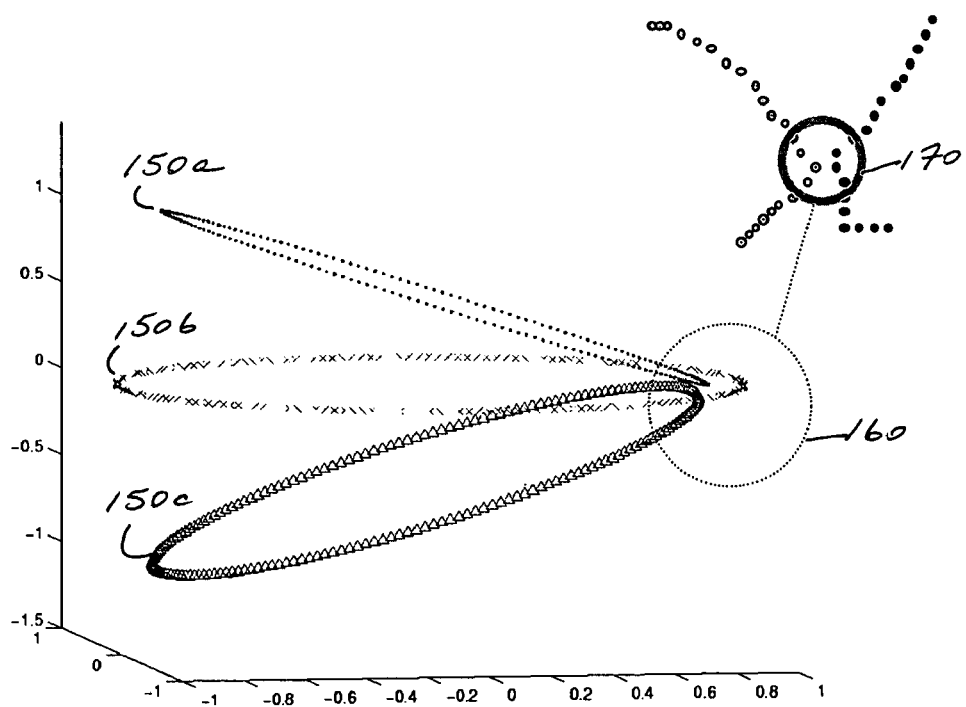
Figure 2:
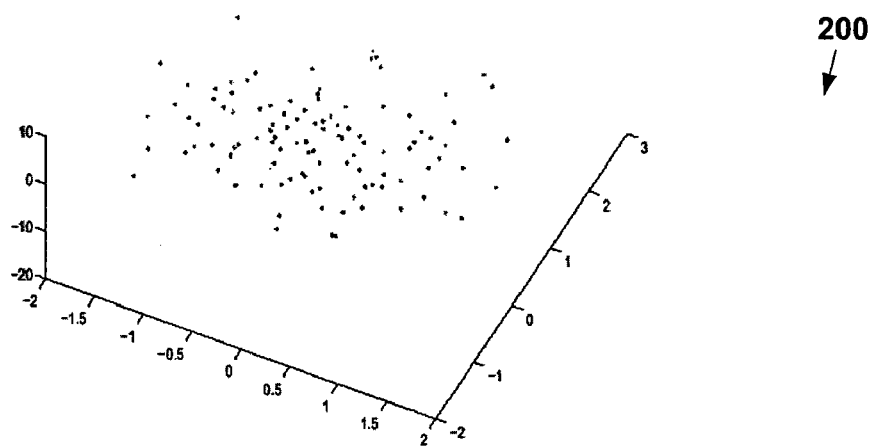
FIG. 2 illustrates concepts of appearance manifolds and conventional clustering methods.
Figure 2:
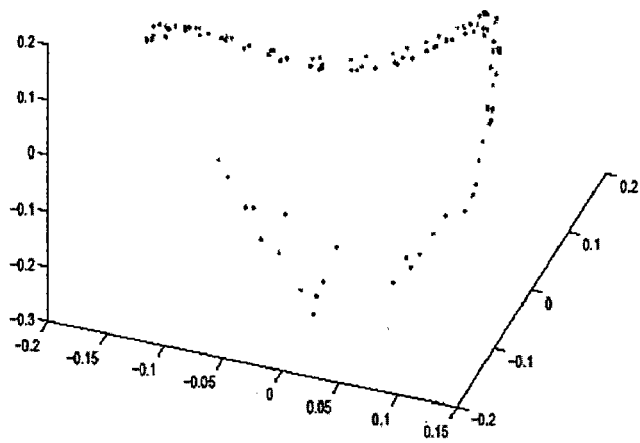
Figure 2:
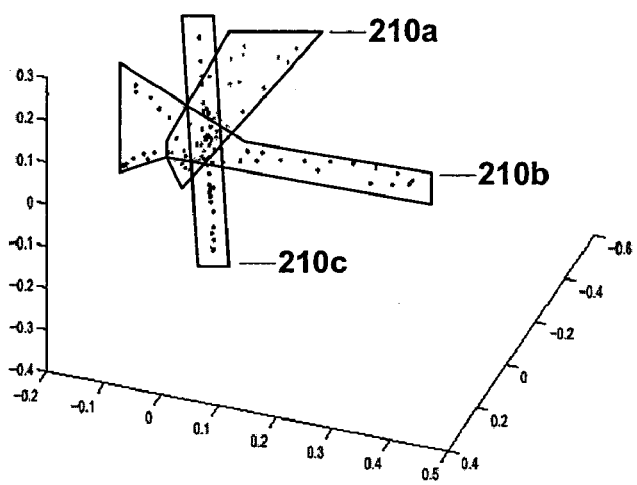

While PCA may be effective when applied to relatively simple manifold regions, it may become unstable when applied to complex regions. For example, PCA might be effective when applied to the manifold structure of FIG. 1(*a*), but would likely not be effective when applied to FIG. 1(*b*).

Figure 5:
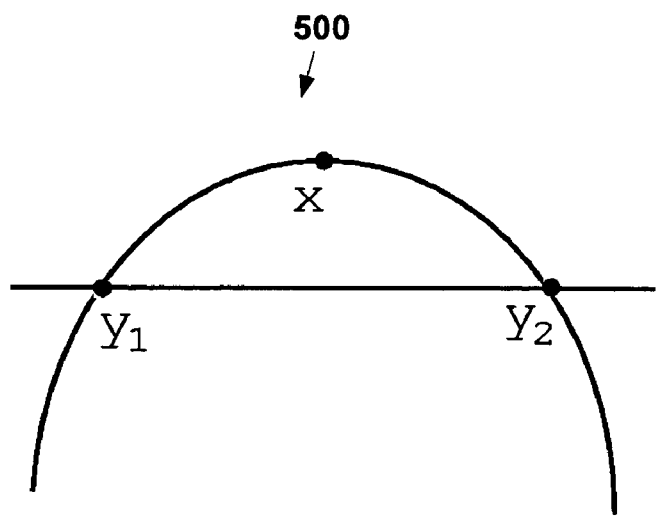
FIG. 5 illustrates the concept of secant chord approximation in two dimensions according to one embodiment of the present invention.
Figures 6, 8:
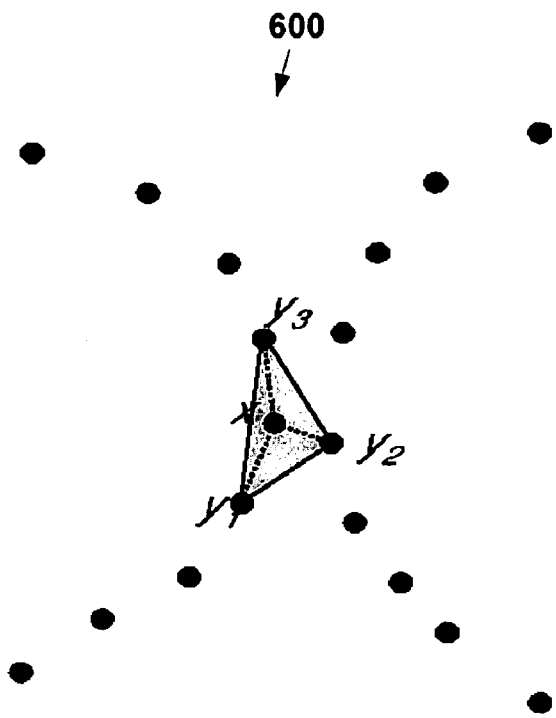
FIG. 6 illustrates the concept of local linearity in two dimensions according to one embodiment of the present invention.
FIG. 8 illustrates experimental results utilizing one embodiment of the invention.

A more robust method of exploiting the local linearity of image manifolds makes use of the secant approximation of a sample point by its neighbors, as depicted in FIG. 5. For a smooth 2D curve as shown, each point x can be approximated well by a point on the secant chord formed by two of its sufficiently close neighbors $y_1$, $y_2$: $x \approx \alpha_1 y_1 + \alpha_2 y_2$, with $\alpha_1, \alpha_2$ non-negative and $\alpha_1 + \alpha_2 = 1$. This can be generalized immediately to higher dimensions: for a point x and its neighbors, $\{y_1, \ldots, y_K\}$, a set of non-negative coefficients $\omega_i$ can be computed as the solution to the following optimization problem:

$$\min \left| x - \sum_{i=1}^{K} \omega_i y_i \right|_{L^2}^2 \quad (1)$$

with the constraint that $$\sum_{i=1}^{K} \omega_i = 1. \ \{y_1, \ldots, y_K\}$$

will in general be linearly independent, since $K \ll s$. Therefore, the coefficients $\omega_i$ will generally be unique. FIG. 6 illustrates that the magnitude of the coefficients $\omega_i$ can be used as an affinity measure locally to detect the presence of any linear structure. That is, a large magnitude of $\omega_i$ indicates the possibility that $y_i$ and x share a common local linear structure. With respect to the clustering problem, this in turn implies that images $y_i$ and x correspond to the same object.

As discussed above, affine symmetry can also be exploited by the LLS algorithm by combining distance metrics and the local linear structure of appearance manifolds in an affine-invariant context. This is mechanized by reformulating Equation 1 in an affine-invariant manner, according to the mathematical notion of a quotient space. A description of this is in D. Mumford, et al., "Geometric Invariant Theory," Springer-Verlag (1994), which is incorporated herein it its entirety. In general, a group G acting on a manifold M can be associated with an abstract topological space M/G, the quotient space. Heuristically, referring again to FIG. 4, the space M/G parameterizes the orbits 440 of the group action. Any quantity defined in M that is invariant under the G-action can be naturally defined as a derived quantity in the space M/G. For instance, a G-invariant distance metric on M in turn defines a distance metric on M/G.

Applying this to the clustering problem, the manifold M is the union of appearance sub-manifolds $\{M_1, \ldots, M_N\}$, and the group G is the 2D affine group. The natural projection map $\pi: M \to M/G$ takes each point x of M to the point $[x] \in M/G$, thus parameterizing the orbit containing x. The manifolds $\{M_1, \ldots, M_N\}$ now descend down to M/G to form $\{\tilde{M}_1, \ldots, \tilde{M}_N\}$. The affine invariant local linear structure of the manifolds $\{M_1, \ldots, M_N\}$ implies the local linear structures of $\{\tilde{M}_1, \ldots, \tilde{M}_N\}$.

The local linear structures of $\{\tilde{M}_1, \ldots, \tilde{M}_N\}$ can be computed by analogy to the standard slice construction for quotient spaces. A description of this is in D. Mumford, et al., "Geometric Invariant Theory," Springer-Verlag (1994). Specifically, for each point [x] of M/G, the local linear structure can be computed by lifting the computation to a sample point $x \in M$ such that $\pi(x) = [x]$. As shown in FIG. 4, at each such point x, by taking a "slice" 450 of the group action, e.g., a linear subspace centered at x that is orthogonal to the G-action through x, the local linear structures on the slice can be analyzed. For each sample point x a slice S is found. All other sample points are projected to S using G, e.g., for a sample point 460, a $\gamma \in G$ is found such that $\gamma(y) \in S$. This is shown schematically as point 430*c*. Such $\gamma$ may not exist for every y but only a few such points are needed to characterize a neighborhood of x. Let $\{y_1', \ldots, y_s'\}$ be the projected points on a slice S. The $L^2$ distance metric in S is used to select the K nearest neighbors of x, say, $\{y_1', \ldots, y_K'\}$ and the neighbors are then used in defining the local linear structure at [x] via Equation 1.

In one implementation, the slice construction outlined above is modified. Instead of actually computing the subspace S, the K neighbors $\{y_1', \ldots, y_K'\}$ are determined by using the "one-sided distance." A description of this is J. Shi and J. Malik, "Normalized cuts and image segmentation," IEEE Transactions on Pattern Analysis and Machine Intelligence 22 (2000), which is incorporated herein in its entirety. For each input sample y, the one-sided distance is defined as $$d_G(x,y) = \min_{\gamma \in G}\{\min\{:|x-\gamma(y)|_{L^2}^2, |y-\gamma(x)|_{L^2}^2:\}\}.$$

Although $d_G(x,y)$ is not a metric, it still allows the definition of the K-nearest neighbors of x, i.e., $\{y_1', \ldots, y_K'\}$. These nearest neighbors are just $\{\gamma_1(y_1), \ldots, \gamma_K(y_K)\}$, where each $\gamma_i$ minimizes the one-sided distance between x and $y_i$.

Although a three-dimensional manifold and two-dimensional projection have been described above for visual convenience, the principles revealed can be extended as necessary to higher-order geometries as well.

In summary, LLS step 340 exploits both metric and local linear structure that are both invariant under the affine group G. These three very general structures are combined to formulate an LLS algorithm whose contribution to the overall clustering algorithm is effective and efficient.

Returning to FIG. 3, in step 350, a matrix of distance measures $d_\Omega$ is derived between pairs of data points $x_i$ and $x_j$: $d_\Omega(x_i,x_j) = \min(1/\omega_{ij}, 1/\omega_{ji})$ where $\omega_{ij}$ are the coefficients computed in step 340 for $x_i$. If $x_j$ is not among the K-nearest neighbors of $x_i$, $\omega_{ij}$ is set to 0.

Step 360 determines whether the nearest neighbors of all images have been evaluated; if not, the next image is selected and steps 330 through 360 are repeated. When all images have been so evaluated, the distance matrix is completed. Step 370 is then invoked, wherein a standard spectral clustering algorithm yields the final clustering results. A description of this can be found in Andrew Ng, Michael Jordan and Yair Weiss, "On Spectral Clustering: Analysis and An Algorithm," Advances in Neural Information Processing Systems, pp. 849–856 (2002).

Figure 7:
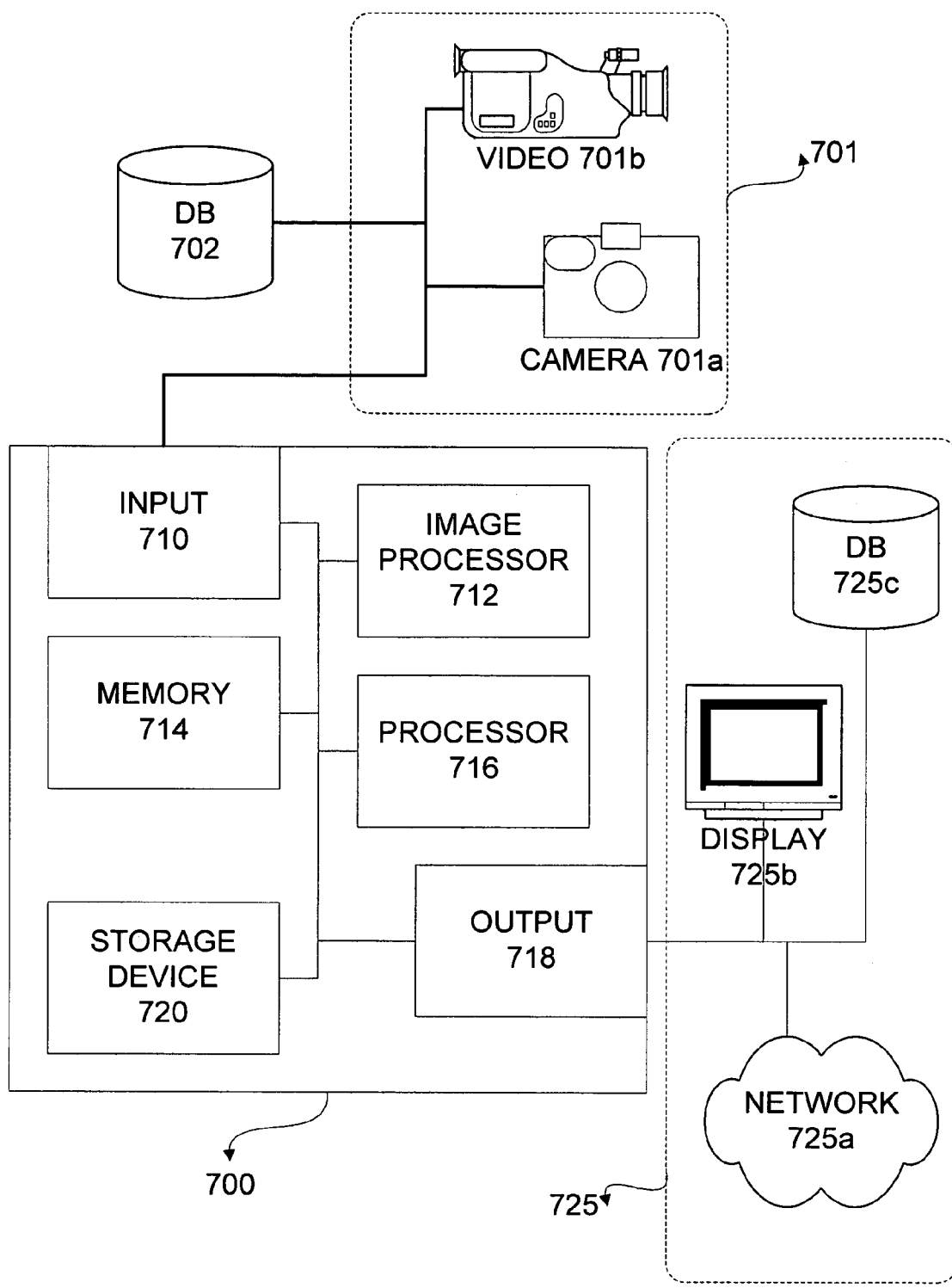
FIG. 7 illustrates a system for implementing one embodiment of the present invention

Now referring to FIG. 7, a system according to another embodiment of the present invention is shown. Computer system 700 comprises an input module 710, a memory device 714, a processor 716, and an output module 718. In an alternative embodiment, an image processor 712 can be part of the main processor 716 or a dedicated device to pre-format digital images to a preferred image format. Similarly, memory device 714 may be a standalone memory device, (e.g., a random access memory chip, flash memory, or the like), or an on-chip memory with the processor 716 (e.g., cache memory). Likewise, computer system 700 can be a stand-alone system, such as, a server, a personal computer, or the like. Alternatively, computer system 700 can be part of a larger system such as, for example, a robot having a vision system (e.g., ASIMO advanced humanoid robot, of Honda Motor Co., Ltd., Tokyo, Japan), a security system (e.g., airport security system), or the like.

According to this embodiment, computer system 700 comprises an input module 710 to receive the digital images I. The digital images, I, may be received directly from an imaging device 701, for example, a digital camera 701a (e.g., robotic eyes), a video system 701b (e.g., closed circuit television), image scanner, or the like. Alternatively, the input module 710 may be a network interface to receive digital images from another network system, for example, an image database, another vision system, Internet servers, or the like. The network interface may be a wired interface, such as, a USB, RS-232 serial port, Ethernet card, or the like, or may be a wireless interface module, such as, a wireless device configured to communicate using a wireless protocol, e.g., Bluetooth, WiFi, IEEE 802.11, or the like.

An optional image processor 712 may be part of the processor 716 or a dedicated component of the system 700. The image processor 712 could be used to pre-process the digital images I received through the input module 710 to convert the digital images, I, to the preferred format on which the processor 716 operates. For example, if the digital images, I, received through the input module 710 come from a digital camera 710a in a JPEG format and the processor is configured to operate on raster image data, image processor 712 can be used to convert from JPEG to raster image data.

The digital images, I, once in the preferred image format if an image processor 712 is used, are stored in the memory device 714 to be processed by processor 716. Processor 716 applies a set of instructions that when executed perform one or more of the methods according to the present invention, e.g., nearest neighbor selection, local linear structure calculations, and the like. While executing the set of instructions, processor 716 accesses memory device 714 to perform the operations according to methods of the present invention on the image data stored therein.

Processor 716 clusters the input images, I, and outputs the results through the output module 718 to an external device 725 (e.g., a database 725a, a network element or server 725b, a display device 725c, or the like). Like the input module 710, output module 718 can be wired or wireless. Output module 718 may be a storage drive interface, (e.g., hard-drive or optical drive driver), a network interface device (e.g., an Ethernet interface card, wireless network card, or the like), or a display driver (e.g., a graphics card, or the like), or any other such device for outputting the clustering results.

Embodiments of the invention were tested by application to libraries of sample images. For 3D objects, the COIL datasets from Columbia University were used, which are popular datasets for validating object recognition algorithms. A description of this can be found in Murase and Nayar, which was cited above. These comprise COIL20 and COIL100, containing images of 20 and 100 objects, respectively. For both datasets, the images of each object were taken 5 degrees apart as the object was rotated on a turntable, so that each object comprises 72 images. This sampling was decimated to stress the clustering algorithm. Accordingly, in the following description, COIL20.2 denotes the collection of images obtained from COIL20 by decimation by a factor of 2, i.e., COIL20.2 contains the same number of objects as COIL20 but half as many images per object. Similarly, COIL20.4 denotes the collection obtained from COIL20 by decimating by a factor of 4 and so on.

A new dataset, VEH10.2, was formed from COIL100.2 by extracting the vehicle images. These vehicles have similar appearances, and therefore challenge the clustering algorithm. In addition, image sequences of human faces were collected from videos of ten individuals to form ten image sequences, i.e. FACE10, with each sequence containing 50 images. Pose variation in this collection is quite large, and non-uniform.

The experimental results are reported in FIG. 8. The invention's performance ranges from very good to excellent for all datasets except COIL100.4. The algorithm's performance on COIL100.4 is not surprising considering that there are 100 objects that are rather sparsely sampled (i.e., every 20 degrees). Error rates are calculated as the ratio of the number of mis-clustered images over the number of images in the dataset. The error rates are shown together with the parameter K, the size of the local neighborhoods.

FIG. 9 compares the performance of the invention with several conventional algorithms. The datasets are as discussed above, and the percentage performance is calculated as indicated above. The results are summarized as follows, in order from poorest to best performance:

Euclidian Distance+K-means Clustering: the data demonstrate that direct $L^2$ comparisons without affine-invariance are not effective.

Euclidian Distance+Spectral Clustering: once again, the data demonstrate that direct $L^2$ comparisons without affine-invariance are not effective.

Affine-invariant+Spectral Clustering: here, affine-invariance is used without local comparisons. This is the "one-sided" distance measure discussed above, and also results in poor performance.

Affine-invariant+K-nearest neighbor+Spectral Clustering: this case shows that by incorporating local linear structure, performance is enhanced.

Affine-invariant+K-nearest neighbor+Local Linear Structure+Spectral Clustering: this case represents one embodiment of the invention, and consistently demonstrates the best results, as a benefit of the use of non-metrical information, including LLS. Note that in the case, once a neighborhood structure has been determined, the local linear structure is exploited to cluster points in the neighborhood.

By utilizing available information within the image space, the invention offers enhanced clustering performance relative to conventional systems. Advantages of the present invention include enhanced clustering reliability, enhanced stability (e.g., ability to discriminate certain closely related images), and enhanced computational efficiency.

Those of skill in the art will appreciate still additional alternative structural and functional designs for a system and a method for appearance-based image clustering through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer-based method for grouping objects within a set of digital images, wherein each image of the set of digital images includes a first object having an identity, the method comprising the steps of:
    identifying a plurality of nearest neighbors of each of the set of digital images within an image space defined by the set of digital images;
    determining a local linear structure for one or more of the set of digital images using said nearest neighbors of each of the set of digital images; and
    determining distances between said nearest neighbors and each digital image based upon said local linear structure.

2. The method of claim 1, further comprising the step of applying a spectral clustering algorithm to said distances between said nearest neighbors and each digital image.

3. A computer system for grouping objects within a set of digital images, wherein each image of the set of digital images includes a first object having an identity, the system comprising:
    means for identifying a plurality of nearest neighbors of each of the set of digital images within an image space defined by the set of digital images;
    means for determining a local linear structure for one or more of the set of digital images using said nearest neighbors of each of the set of digital images; and
    means for determining distances between said nearest neighbors and each digital image based upon said local linear structure.

4. The computer system of claim 3, further comprising means for applying a spectral clustering algorithm to said distances between said nearest neighbors and each digital image.

5. An image processing computer system for grouping objects within a set of digital images, comprising:
    an input module for receiving data representative of the set of digital images, each digital image representative of an object;
    a memory device coupled to said input module for storing said data representative of the set of digital images;
    a processor coupled to said memory device for retrieving said data representative of the set of digital images, the processor configured to:
        identify a plurality of nearest neighbors of each of the set of digital images within an image space defined by the set of digital images;
        determine a local linear structure for one or more of the set of digital images using said nearest neighbors of each of the set of digital images;
        determine distances between said nearest neighbors and each digital image based upon said local linear structure.

6. The image processing computer system of claim 5, further configured to apply a spectral clustering algorithm to said distances between said nearest neighbors and each digital image.

* * * * *